May 2, 1961 M. T. ENDO 2,982,546
CARD PROCESSING APPARATUS
Filed March 12, 1956 2 Sheets-Sheet 1
FIG. 1
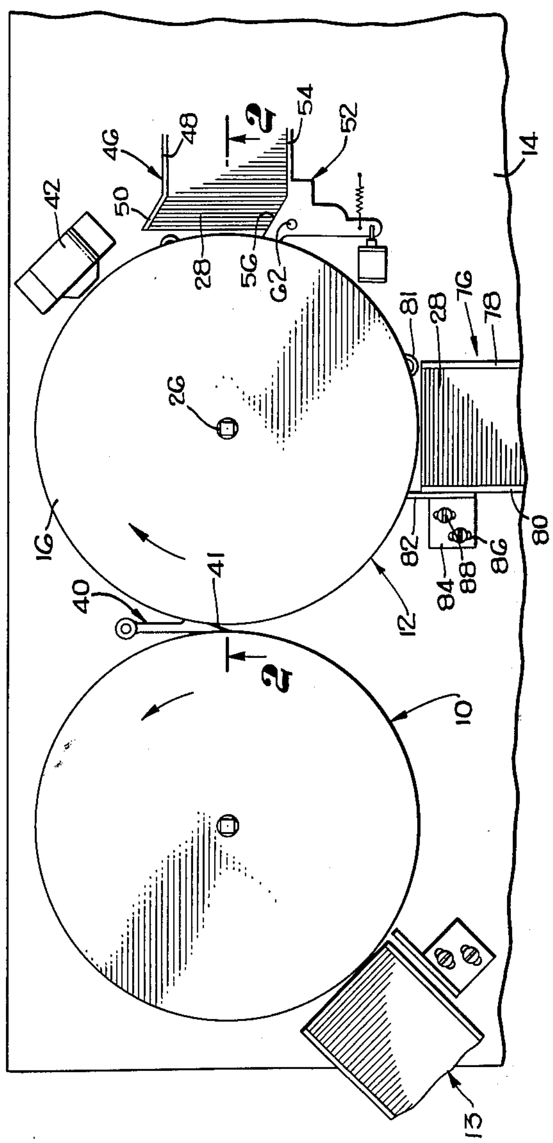
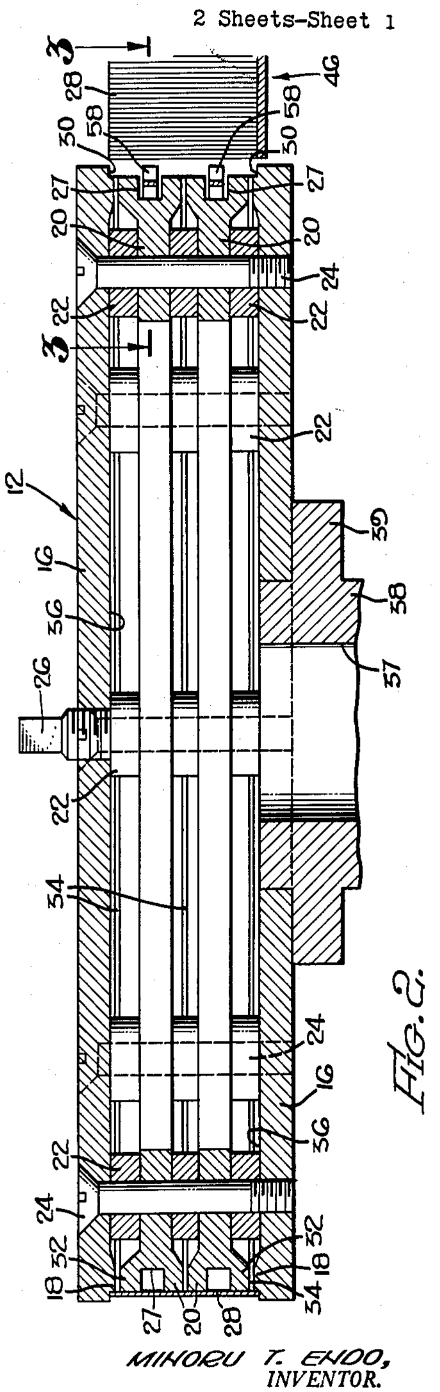
MINORU T. ENDO,
INVENTOR.
BY
Smyth and Roston
ATTORNEYS May 2, 1961 M. T. ENDO 2,982,546

CARD PROCESSING APPARATUS

Filed March 12, 1956 2 Sheets-Sheet 2

MINORU T. ENDO,
INVENTOR.

BY Smyth and Roston
ATTORNEYS 2,982,546

CARD PROCESSING APPARATUS

Minoru T. Endo, Los Angeles, Calif., assignor to The Magnavox Company, Los Angeles, Calif., a corporation of Delaware Filed Mar. 12, 1956, Ser. No. 571,088

8 Claims. (Cl. 271—71)

This invention relates to card processing apparatus and more particularly to apparatus for controlling the transfer of information cards from a drum to an output stack.

In recent years, digital computers and data processing systems have been built for a wide variety of uses. These systems generally operate on a digital basis in which complex information can be represented by pluralities of discrete signals. Data processing systems can be used to control various types of complex operations. For example, the operation of a department store can be controlled with respect to prices and profits on various types of merchandise and the quantities of the different merchandise available in the store. In banks, data processing systems can be used to indicate at any time the state of each customer's account.

In certain data processing systems, information cards are used to store the data which must be processed. Each card is able to store a relatively large number of binary bits of information. In spite of this, a relatively large number of cards often have to be used since hundreds of thousands of bits of information may sometimes be required in a complex system. Because of the large number of cards which are often required, problems relating to the processing of the cards have arisen.

In one type of data processing system, rotating drums have been used to withdraw the cards from an input stack and to move the cards past reading and writing stations. The cards are retained in fixed position on the periphery of the drums during their movements past the reading and writing stations. At certain positions, members are provided to control the transfer of the cards from a first drum to other members such as a second drum. The control members are actuated in accordance with the information on the cards. For example, when a particular control member is actuated, a transfer of the cards from the first drum is obtained. However, the cards continue their movement on the first drum when the control member is not actuated.

This invention provides apparatus for controlling the transfer of cards from a drum to an output stack. The control apparatus includes a pivotable member which is coupled to the drum in one position to remove the cards from the drum and deposit the cards in an output stack. The control member is pivotable to a second position out of cooperative relationship with the drum. In the second position of the control member, the cards are able to remain on the drum for movement past the output stack. The apparatus constituting this invention is especially adapted to be used in controlling the transfer of cards from a drum to first or second output stacks in accordance with the pivotable disposition of the control member.

In the drawings:

Figure 1 is a fragmentary top plan view of first and second rotatable drums, first and second output stacks and control apparatus associated with the second drum for controlling the transfer of cards from the drum to the first and second output stacks;

Figure 2 is an enlarged fragmentary sectional view substantially on the line 2—2 of Figure 1 and illustrates in detail at least a partial construction of one of the drums shown in Figure 1;

Figure 3:
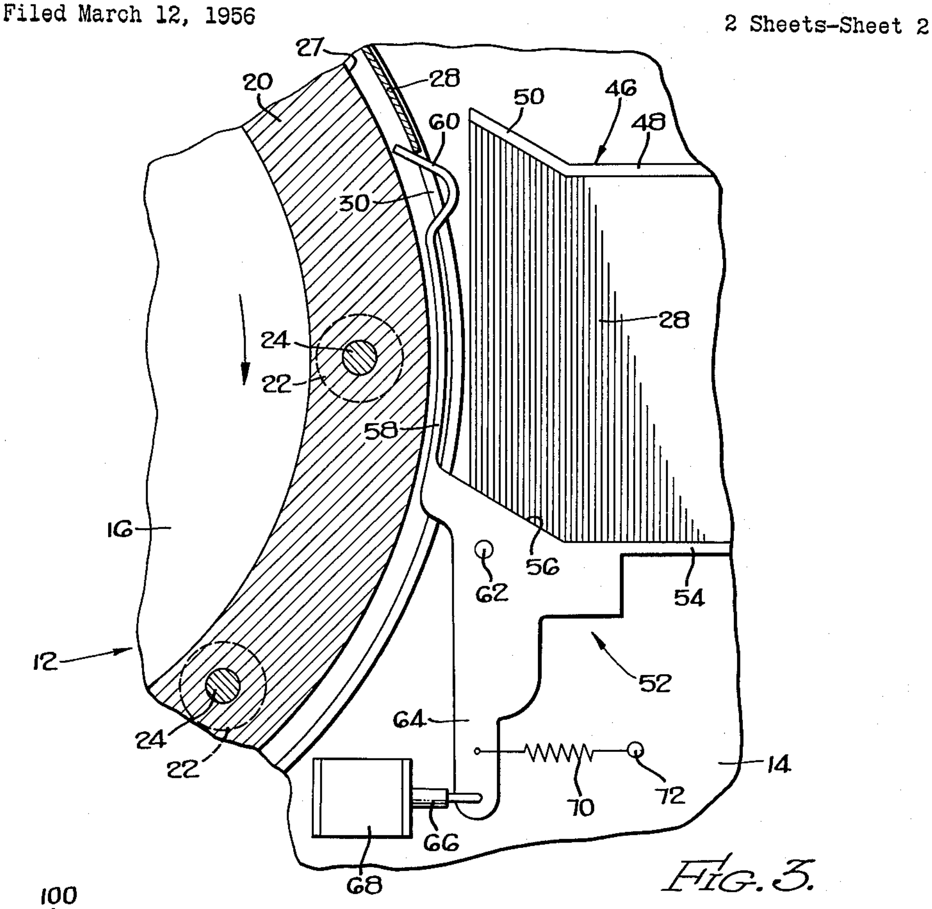
Figure 4:
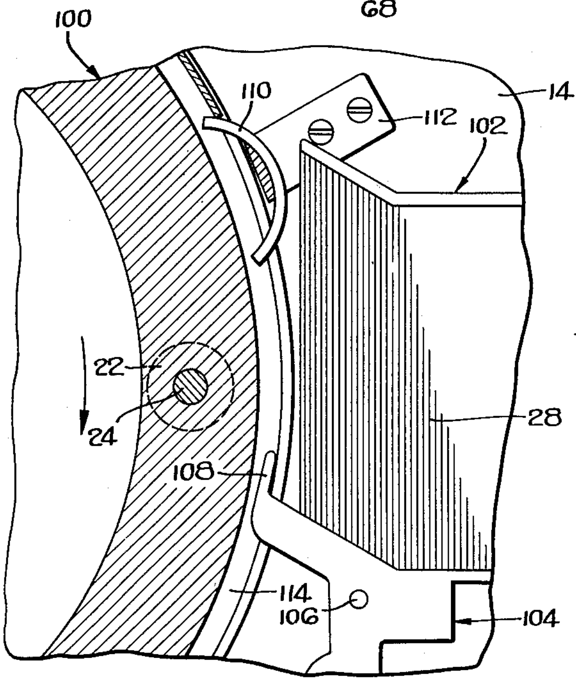

Figure 3 is an enlarged fragmentary top plan view of a portion of the apparatus shown in Figure 1 as seen from a position similar to that shown in Figure 1 and illustrates in detail the second drum, the control apparatus and the output stack when the control apparatus is in position for obtaining a transfer of the cards to the output stack; and Figure 4 is an enlarged fragmentary top plan view of apparatus as seen from a position similar to that shown in Figure 3 and illustrates the construction of a second embodiment of the invention for controlling the transfer of cards from a drum to an output stack.

In the embodiment of the invention shown in Figures 1 to 3, inclusive, a pair of drums generally indicated at 10 and 12 are supported on a table 14 for rotary movement relative to the table. The drum 10 is adapted to receive cards from an input stack 13 or from another drum corresponding to the drums 10 and 12. The input stack 13 may be constructed in a manner similar to that described in detail in co-pending application Serial No. 505,248 filed May 2, 1955, by Alfred M. Nelson et al.

The drums 10 and 12 may be constructed in a similar manner. Because of this, only the construction of the drum 12 is shown in Figure 2 or at least only certain important features of the drum 12 are shown in Figure 2. As shown in Figure 2, the drum 12 includes a pair of exterior plates 16 defining a housing and having inwardly disposed lip portions 18 at their peripheries.

A second pair of plates 20 are disposed within the housing defined by the plates 16 and are suitably disposed in spaced relationship to the plates 16 as by spacers 22 mounted on studs 24. The studs 24 extend through the plates 16 and 20 at positions near the peripheries of the plates to maintain the plates in fixed position relative to each other. A plug 26 also extends into a threaded socket in the upper plate 16 at the annular center of the plate.

The plates 20 are provided with relatively deep annular slots 27 for purposes which will be described in detail subsequently. The radius of the plates 20 is slightly less than that of the plates 16 by a distance corresponding substantially to the thickness of cards 28 so as to form a neck portion 30 relative to the periphery of the plates 16. Each of the plates 20 has annular flange portions 32 extending axially from both of its faces at a position near the periphery of the plate. The flange portions 32 are so formed as to produce slots 34 between the plates 20 and between the flanges on the plates 20 and the lip portions 18 on the plates 16.

The slots 34 communicate with suction passageways 36 formed between adjacent plates by the inclusion of the spacers 22. The passageways 36 in turn communicate with an axial hole 37 in a rotatable shaft 38. A hole is provided in the bottom plate 16 so that the plate can be push fit on the shaft and pressed against a collar 39 on the shaft. The construction of the drum 12 and of apparatus associated with the drum for producing a rotation of the drum and a withdrawal of air through the axial hole in the drum is described in detail in co-pending application Serial No. 505,248 filed May 2, 1955, by Alfred M. Nelson et al.

The cards 28 are adapted to be positioned on the drums 10 and 12 within the neck portions 30 of the drums. Each of the cards 28 is provided with a plurality of bits of information. Each bit by itself or in combination with other bits represents information in digital form. This information may relate to numbers, alphabetic letters, combinations of numbers and letters (alphanumeric coding) or any other pertinent matter. The bits of information may be disposed in rows, each of which extends in a direction substantially parallel to the top of table 14.

The bits of information may be provided in any suitable form on each card 10. For example, the information may be represented by holes or the absence of holes at the different positions. Preferably, the information is represented in magnetic form. In this form, magnetic fluxes of one polarity at a position may represent an indication of "0" or a "false" state and magnetic fluxes of an opposite polarity at a position may represent an indication of "1" or a "true" state.

A gate 40 is disposed between the drums 10 and 12 at the position of contiguity between the drums. The gate 40 is provided with at least one finger 41 which is shaped and disposed to remove cards from the periphery of the drum 10 and to guide the cards to the periphery of the drum 12. The gate 40 may be fixedly positioned to obtain a transfer to the drum 12 of every card moving with the drum 10 toward the gate. A gate having a fixed position is disclosed in co-pending application Serial No. 505,248 filed May 2, 1955, by Alfred M. Nelson et al. The gate 40 may also be pivotably disposed to provide for a transfer of cards from the drum 10 to the drum 12 in one position and to produce a recirculation of cards on the drum 10 in a second position. Such a gate is disclosed in co-pending application Serial No. 529,886 filed August 22, 1955, by Alfred M. Nelson, et al.

A transducing member 42 is shown in Figure 1 as being disposed in contiguous relationship to the drum 12. Although only the transducing member 42 is shown in the drawings, it should be appreciated that a plurality of transducing members can be used. The transducing member 42 is disposed in contiguous relationship to the periphery of the drum 12 at an angular position removed from the gate 40 in the direction of rotation of the drum. Since the drum 12 is shown as rotating in a clockwise direction in Figure 1, the transducing member 42 is shown as being displaced in a clockwise direction from the gate 40.

When bits of magnetic information are stored in the cards 28, each of the transducing members such as the member 42 is provided with magnetic means such as a coil. The various coils such as the coil in the transducing member 42 are so disposed as to be coupled to the cards 28 during the movement of the cards with the drum 12 past the transducing member. The transducing member 42 may be connected to "read" the magnetic indications on the different cards and to convert these magnetic indications into a corresponding pattern of electrical signals. The transducing member 42 may be also connected to record magnetic information on the cards 28 in accordance with the electrical signals introduced to the transducing members.

An output stack generally indicated at 46 is disposed in contiguous relationship to the periphery of the drum 12 at a position removed from the gate 40 and from the transducing member 42 in the direction of rotation of the drum 12. The output stack 46 is shown in Figure 1 as being displaced in a clockwise direction from the gate 40 and the transducing member 42 since the drum 12 is shown by an arrow as rotating in that direction. The output stack 46 includes a first wall 48 disposed in a direction substantially perpendicular to the periphery of the drum 12. At a position near the drum 12, the wall 48 extends at an oblique angle in a direction toward the transducing member 42. The oblique portion of the wall 48 is indicated at 50 in Figure 3. It should be appreciated that the oblique portion 50 is indicated by way of example and that actually the wall 48 can extend in a direction substantially perpendicular to the drum 12 to a position contiguous to the drum.

The other wall of the output stack 46 is defined in part by a control member generally indicated at 52. The control member has a first wall 54 disposed in substantially parallel relationship to the wall 48 at a distance from the wall 48 corresponding substantially to the length of the information cards 28. The wall 54 is integral with a wall portion 56 which is substantially parallel to the wall 50.

The wall portion 56 extends to the periphery of the drum 12 and meets fingers 58 at a position contiguous to the periphery of the drum 12. The fingers 58 are positioned within the slots 27 in the plates 20 forming a part of the drum 12. The fingers 58 extend along the slots 27 in a substantially counterclockwise direction in Figures 1 and 3 to a position near the wall portion 50. At their forward ends, the fingers 58 are bent to form pawls 60. The pawls 60 are bent to extend initially in an outward direction from the periphery of the drum 12 and then to extend back into the sockets 27. At their forward end, the pawls 60 extend within the slots 27 to positions radially interior to the disposition of the cards 28 within the throat portions 30.

The control member 52 is pivotable on a pin 62 at a position near the wall 56. The control member 52 also has an arm 64 which extends in a direction away from the wall 56. An armature 66 is attached to the arm 64 at the outer end of the arm. The armature 66 is adapted to be actuated by a solenoid 68 when the solenoid is energized. The armature 66 acts upon the arm 64 in a direction opposite to a spring 70. One end of the spring 70 is attached to the arm 64 and the other end of the spring is attached to a suitable post 72 having a fixed position.

An output stack generally indicated at 76 in Figure 1 is disposed in contiguous relationship with the drum 12 at a position removed from the output stack 46 in the direction of rotation of the drum. Since the drum 12 is shown as rotating in a clockwise direction in Figure 1, the output stack 76 is displaced in a clockwise direction from the stack 46 in Figure 1. The output stack 76 includes a pair of parallel walls 78 and 80 separated from each other by a distance corresponding to the length of the cards 28. The walls 78 and 80 are shown in Figure 1 as extending from their full length in a direction substantially perpendicular to the drum 12. However, it should be appreciated that the walls 78 and 80 can be provided with oblique portions corresponding to the wall portions 50 and 56 of the stack 46. Pawls 81 are associated with the stack 76 to perform functions similar to the pawls 60, as will be described in detail subsequently.

A stop 82 extends along the wall 80 to a position within the neck portion 30 of the drum 12. The stop 82 is attached to a plate 84 having elongated holes 86. Screws 88 extend through the holes 86 into the table 14 to hold the plate 84 and the stop 82 in fixed position relative to the table. By including the elongated holes 86, the stop 82 can be adjustably positioned relative to the throat portion 30 of the drum 12.

Only the output stacks 46 and 76 are shown by way of illustration. It should be appreciated, however, that a plurality of output stacks can be used. All of the stacks except the last stack may be constructed in a manner similar to the stack 46. The last stack may be the stack 76. By providing such an arrangement, a conditional transfer of the cards may be obtained to the various stacks in accordance with the flow of current through the solenoids corresponding to the solenoid 68. When all of the solenoids are energized, the cards travel to the output stack 76 for depositing in that stack.

Since the drums 10 and 12 are constructed in a similar manner as described above, they also operate in a similar manner. For this reason, the operation of the drum 10 should be understood from a description of the operation of the drum 12. Since the drum 12 is coupled to the shaft 38, it rotates with the shaft when the shaft is driven by a suitable means such as a motor (not shown). Air is withdrawn by a suitable vacuum pump (not shown) through the hollow contours of the shaft 38, the passageways 36 and the slots 34. In this way, a vacuum pressure is exerted on the periphery of the drum 12. This vacuum pressure acts upon the cards 28 to maintain the cards in fixed position on the periphery of the drum 12. By fixedly positioning the cards 28 on the periphery of the drum 12, the cards 28 are able to move with the drum as the drum rotates.

In like manner, the cards 28 remain fixedly positioned on the drum 10 during the drum rotation. The cards 28 can become transferred to the drum 10 from the various members such as the input stack (13) or from another drum similar to the drums 10 and 12. After becoming transferred to the drum 10, the cards remain fixedly positioned on the drum until they reach the gate 40. The fingers 41 on the gate 40 then operate to remove the cards 28 from the periphery of the drum and guide the cards to the periphery of the drum 12.

When the cards 28 reach the periphery of the drum 12, they become fixedly positioned on the periphery of the drum because of the vacuum force exerted on the periphery of the drum by the withdrawal of air through the slots 34. The cards then move with the drum 12 as the drum rotates in a clockwise direction. As the cards 28 move past the transducing member 42, signals are induced in the transducing member in a pattern related to the bits of magnetic information on the card. These signals are used in a data processing system which may include the members shown in the drawings and described above. The signals may be used to control the operation of various members in the data processing system including the solenoid 68 and the control member 52 associated with the solenoid.

The solenoid 68 may normally be considered as not energized. Since the solenoid 68 is not energized, the armature 66 is not actuated. This causes the force exerted by the spring 70 to be predominant such that the spring acts to pivot the control member 52 in a counterclockwise direction on the pivot pin 62 as a fulcrum. When the control member 52 pivots in a counterclockwise direction, it causes the fingers 58 on the control member to pivot to a position within the slots 27 in the drum 12. The pawls 60 move with the fingers 58 such that the leading edges of the pawls become disposed in the slots 27 at positions radially interior to the neck portion 30.

Since the pawls 60 have positions radially interior to the disposition of the cards 28 in the neck portions 30, the pawls act to remove the cards 28 from the periphery of the drum 12. This may be best seen in Figure 3 where the leading edge of one of the cards 28 is shown as approaching the pawls 60. The cards 28 then follow the outwardly extending portions of the pawls 60 to positions removed from the periphery of the drum 12.

Because of the vacuum force exerted through the drum 12 on the cards 28, the cards tend to return to the periphery of the drum 12 after reaching the extremity of the pawls.

The cards move along the fingers 58 to the wall portion 56 of the control member 52. The wall 56 then interrupts the movements of the cards so that the cards become disposed within the stack 46. The cards become disposed within the stack 46 in an order related to the sequence of their movements with the drums 12. The cards become stacked in the proper order by the action of the pawls 60. This results from the fact that the leading edge of one card moves along the pawls 60 at the time that the trailing edge of the preceding card is disposed on the pawl. Because of this, the leading edge of each card is able to become positioned between the pawl and the trailing edge of the preceding card so as to force the preceding card into the stack 46.

When the solenoid 68 becomes energized upon the occurrence of particular signals in the transducing member 42, it actuates the armature 66 toward the left in Figures 1 and 3. The armature 66 in turn acts upon the control member 52 to pivot the control member in a clockwise direction on the pin 62 as a fulcrum. The pivotal movement of the control member 52 causes the pawls 60 to move out of the slots 27 in the drum 12. By producing such a movement of the pawls 60, the pawls no longer block the movement of the cards 28 with the drum 12. The fingers 58 also move with the pawls 60 to positions away from the periphery of the drum 12. Because of this, the cards 28 have a clear path for movement with the drum 12 past the output stack 46.

After moving past the stack 46, the cards continue to move with the drum 12 as the drum rotates. The cards may move with the drum 12 through a complete revolution back to the output stack 46 if no members such as the output stack 76 are disposed in contiguous relationship to the drum to interrupt the movements of the cards. If the solenoid 68 is not energized at the time that the cards have completed a revolution of movement, the cards may continue past the output stack 46 through another complete revolution of the drum. In this way, the cards 28 may be able to continue their movement with the drum 12 through a plurality of revolutions during the time that the solenoid 68 is energized when the output stack 76 is not included in the apparatus.

As shown in Figure 1, members may be disposed in contiguous relationship with the drum 12 to interrupt the movement of the cards with the drum after the cards have moved a particular distance past the output stack 46. These members may include another drum similar to the drums 10 and 12 or they may include an output stack such as the stack 76 in Figure 1. When the cards reach the stop 82 forming a part of the stack 76, the stop prevents any further movement of the cards with the drum 12 and acts to deposit the cards in the stack 76. In this way, the control member 52 is instrumental in one position in obtaining a transfer of the cards from the drum 12 to the output stack 46. In a second position, the control member 52 is instrumental in obtaining a transfer of the cards from the drum 12 to the stack 76. The control member 52 can be formed easily and can be easily actuated by energizing means such as the solenoid 68. The members shown in Figures 1 to 3, inclusive, provide a positive control over the movements of the cards 28 to the output stacks 46 and 76 so that the cards become deposited in the proper stacks.

Figure 4 illustrates another embodiment of the invention. The embodiment shown in Figure 4 includes a drum 100 and an output stack 102 respectively corresponding to the drum 12 and the output stack 46 shown in Figures 1 to 3, inclusive, and described fully above. A control member 104 is associated with the drum 100 and the output stack 102. The control member 104 defines one wall of the stack 102 in a manner similar to that described above for the control member 52 in the previous embodiment.

The control member 104 is pivotable on a pin 106 as a fulcrum. Fingers 108 extend from the control member 104 in a direction opposite to the direction in which the drum 100 rotates. The fingers 108 have a length shorter than the fingers 58 in the previous embodiment. The fingers 108 are separated from pawls 110 in the direction of rotation of the drum 100. The pawls 110 are attached to a bracket 112 for fixed positioning relative to the drum 100. The pawls 110 have curved configurations such that the opposite ends of the pawls extend into slots 114 in the drum 100 corresponding to the slots 27 in the drum 12.

As the cards 28 move with the drum 100, they become removed from the drum by the pawls 110. The cards then travel along the pawls 110 and tend to return to the periphery of the drum because of the vacuum force exerted on the cards by the drum. In one positioning of the control member 104, the cards move with the drum past the output stack 102 since the fingers 108 are not disposed in coupled relationship with the drum.

In a second positioning of the control member 104, the fingers 108 are disposed within the slots 114 in the drum 100. Because of this disposition, the fingers 108 act to prevent the cards from moving with the drum 100 past the output stack 102. At the time that the leading edge of each card 28 is reaching the fingers 108, the trailing edges of the card are positioned against the pawls 110. In this way, the fingers 108 and the pawls 110 act simultaneously to remove the card from the drum 100 for disposition in the output stack 102.

The cards become positioned within the output stack 102 in the order of their movement on the drum 100 because of the action of the pawls 110. As described in connection with the previous embodiment, the pawls 110 are shaped so that the leading edge of each card exerts a prying action on the trailing edge of the preceding card. This prying action is instrumental in forcing the preceding card completely from the drum 100 and into the output stack 102.

Although this invention has been disclosed and illustrated with reference to particular applications, the principles involved are susceptible of numerous other applications which will be apparent to persons skilled in the art. The invention is, therefore, to be limited only as indicated by the scope of the appended claims. For example, the term "cards" as used in the claims is not intended to cover any type of discrete elements which are capable of recording information for subsequent reproduction of this information.

What is claimed is:

1. In combination for use with a plurality of cards having data recorded on the cards, transport means constructed to obtain a movement of the cards, a card holder including first and second walls disposed in spaced relationship, the card holder being constructed to hold cards in the plurality in stacked relationship between the first and second walls, one of the walls in the card holder being disposed in contiguous relationship to the cards on the transport means and being pivotable to a first position in coupled relationship to the cards on the transport means for a transfer of cards from the transport means into the card holder and being pivotable to a second position out of coupled relationship to the cards on the transport means for a transport of cards past the card holder, and means coupled to the pivotable wall to obtain a pivotal movement on the wall to the first and second positions.

2. The combination set forth in claim 1 in which a second card holder is constructed to hold cards in the plurality in stacked relationship and is disposed in coupled relationship to the cards on the transport means at a position past the first card holder in the direction of transport of the cards to obtain a transfer into the second card holder of the cards transported past the first card holder.

3. In combination for use with a plurality of cards having data recorded on the cards, transport means movable in a closed loop and constructed to obtain a movement of the cards with the transport means, a card holder disposed in contiguous relationship to the transport means and provided with first and second walls disposed in spaced relationship to hold cards in the plurality in stacked relationship between the walls, the first wall being disposed in trailing relationship to the second wall in the direction of transport of the cards, the first wall being pivotable to first and second positions, the first wall being provided with a finger which engages the cards on the transport means in the first position to strip the cards from the transport means for movement into stacked relationship in the card holder and which is out of coupled relationship with the cards on the transport means in the second position, and a pick-off member disposed in coupled relationship to the cards on the transport means at a position between the first and second walls and near the second wall to maintain the trailing ends of the cards away from the transport means and to facilitate the transfer of cards into the card holder in an order related to the transfer of cards from the transport means.

4. The combination set forth in claim 3 in which means are operative upon the pivotable first wall to obtain a pivotal movement of the first wall to the first position at first particular times and to obtain a pivotal movement of the first wall to the second position at second particular times.

5. In combination for use with a plurality of cards having data recorded on the cards, transport means movable in a closed loop and constructed to retain cards on the transport means for movement with the transport means, the transport means being provided with a passageway at its periphery for the exhaustion of air through the passageway to create a vacuum effect at the periphery of the transport means, a card holder including first and second walls disposed in spaced relationship to hold cards in stacked relationship within the card holder, the first wall being displaced from the second wall in the direction of movement of the cards and being pivotable between first and second positions, a finger extending from the first wall for movement with the first wall to a position within the passageway in the transport means in the first position of the first wall and for movement with the first wall to a position removed from the passageway in the transport means in the second position of the first wall, and a pick-off member disposed between the first and second walls of the card holder at a position near the first wall of the card holder and extending into the passageway in the transport means in the first position of the first wall to maintain the trailing ends of the cards away from the transport means upon a transfer of the cards into the card holder and to facilitate the transfer of the cards into the card holder in the same order as the removal of the cards from the transport means, and means operatively coupled to the first wall to obtain a movement of the wall to the first position at first particular times and to obtain a movement of the wall to the second position at second particular times.

6. The combination set forth in claim 5 in which the pick-off member is disposed at the end of the finger for movement within the passageway in the transport means in the first position of the finger and for movement out of the passageway in the second position of the finger.

7. In combination for use with a plurality of cards having data recorded on the cards, the combination of: transport means for the cards, a card holder including first and second walls disposed in spaced relationship to hold cards in the plurality in stacked relationship, a pivotable member having a finger pivotable between first and second positions, the finger being disposed in the first position in coupled relationship to the cards on the transport means and being disposed relative to the card holder to obtain a transfer into the card holder of the cards removed from the transport means, the finger being disposed in the second position out of coupled relationship with the cards on the card holder, the finger having a raised portion positioned between the first and second walls of the card holder and disposed in the first position in coupled relationship to the cards on the transport means to raise the trailing ends of the cards from the transport means and to facilitate a transfer of cards into the card holder in the same order as the removal of the cards from the transport means and being disposed in the second position out of coupled relationship with the cards on the transport means, and means operatively coupled to the pivotable member to obtain a movement of the pivotable member to the first position at first particular times and to obtain a movement of the pivotable member to the second position at second particular times.

8. The combination set forth in claim 7 in which the transport means is a rotatable member constructed to retain cards in the plurality in fixed position on the rotatable member for movement with the rotatable member and in which a second card holder is constructed to hold cards in the plurality in stacked relationship and is disposed in coupled relationship to the cards on the rotatable member at a position past the first card holder in the direction of movement of the cards to obtain a transfer into the second card holder of the cards moving with the transport means past the first card holder.

References Cited in the file of this patent

UNITED STATES PATENTS

| | | |
|---|---|---|
| 1,669,238 | Goss | May 8, 1928 |
| 2,019,843 | Clark | Nov. 5, 1935 |
| 2,569,799 | Carroll et al. | Oct. 2, 1951 |
| 2,752,154 | Nelson | June 26, 1956 |
| 2,795,328 | Tyler | June 11, 1957 |
| 2,804,974 | Noon | Sept. 3, 1957 |
| 2,842,362 | Hayes | July 8, 1958 |

FOREIGN PATENTS

| | | |
|---|---|---|
| 912,487 | France | Apr. 29, 1946 |